United States Patent
Chen et al.

(10) Patent No.: US 10,110,915 B2
(45) Date of Patent: Oct. 23, 2018

(54) METHOD AND APPARATUS FOR INTER-COMPONENT MOTION PREDICTION IN THREE-DIMENSIONAL VIDEO CODING

(71) Applicant: HFI Innovation Inc., Zhubei, Hsinchu County (TW)

(72) Inventors: Yi-Wen Chen, Taichung (TW); Jian-Liang Lin, Su'ao Township Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 345 days.

(21) Appl. No.: 14/433,344

(22) PCT Filed: Sep. 27, 2013

(86) PCT No.: PCT/CN2013/084472
§ 371 (c)(1),
(2) Date: Apr. 2, 2015

(87) PCT Pub. No.: WO2014/053095
PCT Pub. Date: Apr. 10, 2014

(65) Prior Publication Data
US 2015/0208086 A1    Jul. 23, 2015

Related U.S. Application Data

(60) Provisional application No. 61/744,855, filed on Oct. 3, 2012.

(51) Int. Cl.
*H04N 19/527* (2014.01)
*H04N 19/182* (2014.01)
(Continued)

(52) U.S. Cl.
CPC ......... *H04N 19/527* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS

| 2004/0120400 | A1* | 6/2004 | Linzer | H04N 5/145 375/240.16 |
| 2005/0207664 | A1* | 9/2005 | Ramasastry | H04N 19/63 382/240 |

(Continued)

FOREIGN PATENT DOCUMENTS

| CA | 2 846 425 | 3/2013 |
| CN | 1765133 | 4/2006 |

(Continued)

OTHER PUBLICATIONS

International Search Report dated Jan. 2, 2014, issued in PCT/CN2013/084472.

(Continued)

*Primary Examiner* — Kate H Luo
(74) *Attorney, Agent, or Firm* — McClure, Qualey & Rodack, LLP (57) ABSTRACT

Embodiments of the present invention identify a texture collocated block of a texture picture in the given view corresponding to a current depth block. A Merge candidate, or a motion vector predictor (MVP) or disparity vector predictor (DVP) candidate is derived from a candidate list including a texture candidate derived from motion information of the texture collocated block. Coding or decoding is then applied to the input data associated with the current depth block using the texture candidate if the texture can- (Continued)

didate is selected as the Merge candidate in Merge mode or the texture candidate is selected as the MVP or DVP candidate in Inter mode.

20 Claims, 4 Drawing Sheets

(51) Int. Cl.
    *H04N 19/184* (2014.01)
    *H04N 19/176* (2014.01)
    *H04N 19/597* (2014.01)
    *H04N 19/196* (2014.01)
    *H04N 19/105* (2014.01)
    *H04N 19/52* (2014.01)
    *H04N 19/159* (2014.01)
    *H04N 19/513* (2014.01)

(52) U.S. Cl.
    CPC ......... *H04N 19/176* (2014.11); *H04N 19/182* (2014.11); *H04N 19/184* (2014.11); *H04N 19/196* (2014.11); *H04N 19/197* (2014.11); *H04N 19/513* (2014.11); *H04N 19/52* (2014.11); *H04N 19/597* (2014.11)

(56) References Cited

U.S. PATENT DOCUMENTS

| | | | | |
|---|---|---|---|---|
| 2005/0232499 | A1* | 10/2005 | Ha | H04N 19/53 382/236 |
| 2008/0285654 | A1 | 11/2008 | Cai et al. | |
| 2010/0201870 | A1* | 8/2010 | Luessi | G06T 1/00 348/452 |
| 2011/0216833 | A1* | 9/2011 | Chen | H04N 13/0022 375/240.16 |
| 2012/0236934 | A1* | 9/2012 | Chen | H04N 19/597 375/240.03 |
| 2014/0341291 | A1* | 11/2014 | Schwarz | H04N 19/597 375/240.16 |

FOREIGN PATENT DOCUMENTS

| CN | 101742349 | 6/2010 |
|---|---|---|
| CN | 102055982 | 5/2011 |

OTHER PUBLICATIONS

Tech, G., et al.; "3D-HEVC Test Model 1 ;" Joint Collaborative Team on 3D Video Coding Extension Development of ITU-T SG 16 WP 3 and ISO/IEC JTC 1/SC 29/WG 11; Jul. 2012; pp. 1-82.

Oh, H., et al.; "H.264-Based Depth Map Sequence Coding Using Motion Information of Corresponding Texture Video;" 2006; pp. 898-907.

Oh, K.J., et al.; "3D-AVC results on improved inside view motion prediction;" Joint Collaborative Team on 3D Video Coding Extension Development of ITU-T SG 16 WP 3 and ISO/IEC JTC 1/SC 29/WG 11; Jul. 2012; pp. 1-2.

* cited by examiner

Current block in texture picture

Current block in depth map

*Fig. 4*

Corresponding texture picture

Depth picture

METHOD AND APPARATUS FOR INTER-COMPONENT MOTION PREDICTION IN THREE-DIMENSIONAL VIDEO CODING

CROSS REFERENCE TO RELATED APPLICATIONS

The present invention is a National Stage of PCT/CN2013/084472, filed on Sep. 27, 2013, which claims priority to U.S. Provisional Patent Application Ser. No. 61/744,855, filed on Oct. 3, 2012, entitled "Inter-Component Motion Prediction for Video Coding". The priority applications are hereby incorporated by reference in their entirety.

FIELD OF INVENTION

The present invention relates to three-dimensional video coding. In particular, the present invention relates to depth coding using motion information associated with texture pictures in three-dimensional video coding.

BACKGROUND OF THE INVENTION

Three-dimensional (3D) television has been a technology trend in recent years that intends to bring viewers sensational viewing experience. Various technologies have been developed to enable 3D viewing. The multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism. 3D video formats may also include depth maps associated with corresponding texture pictures. The depth maps also have to be coded to rendering three-dimensional view or multi-view.

Figure 1:
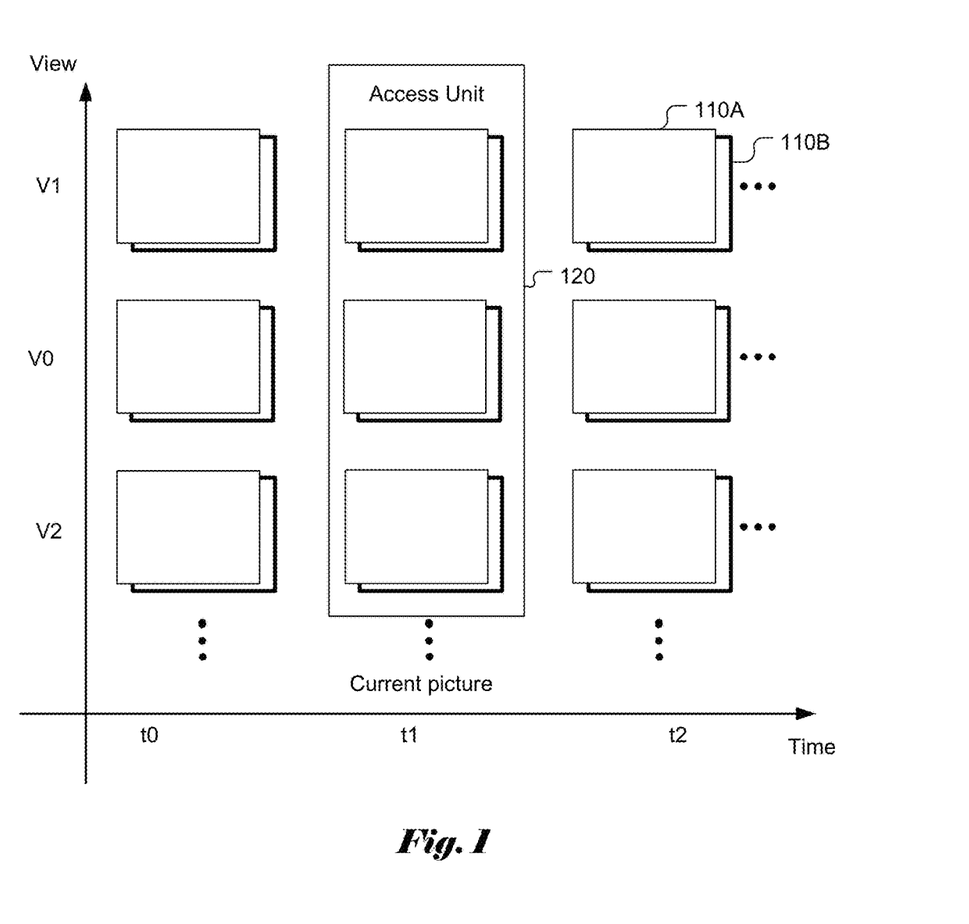
FIG. 1 illustrates an example of coding structure for a three-dimensional video coding system based on motion compensated prediction (MCP) and disparity compensated prediction (DCP), where texture and depth pictures in a same time instance are grouped into one access unit (AU).

Various techniques to improve the coding efficiency of 3D video coding have been disclosed in the field. There are also development activities to standardize the coding techniques. For example, a working group, ISO/IEC JTC1/SC29/WG11 within ISO (International Organization for Standardization) is developing an HEVC (High Efficiency Video Coding) based 3D video coding standard (named 3D-HEVC). To reduce the inter-view redundancy, a technique, called disparity-compensated prediction (DCP) has been added as an alternative coding tool to motion-compensated prediction (MCP). MCP is also referred as Inter picture prediction that uses previously coded pictures of the same view in a different access unit (AU), while DCP refers to an Inter picture prediction that uses already coded pictures of other views in the same access unit, as shown in FIG. 1. The vector used for DCP is termed as disparity vector (DV), which is analog to the motion vector (MV) used in MCP. The video pictures (110A) and depth maps (110B) corresponding to a particular camera position are indicated by a view identifier (viewID). For example, video pictures and depth maps associated with three views (i.e., V0, V1 and V2) are shown in FIG. 1. All video pictures and depth maps that belong to the same camera position are associated with the same viewID. The video pictures and, when present, the depth maps are coded access unit by access unit, as shown in FIG. 1. An AU (120) includes all video pictures and depth maps corresponding to the same time instant. The motion data compression is performed for each picture after all the pictures (both texture and depth) within the same AU are coded. In this case, for each AU, the reconstruction process for pictures within the AU can rely on full-resolution motion data associated with the current AU. The motion data compression will only affect the reconstruction process of other AUs that refer the compressed motion data associated with the current AU.

3D-HEVC is an extension of HEVC that is being developed for encoding/decoding 3D video. One of the views, which is also referred to as the base view or the independent view, is coded independently of the other views and the depth data; the texture picture in the based view is coded using a conventional HEVC video coder.

In 3D-HEVC version 4.0, Inter mode, Merge and Skip mode are used for depth coding. For depth coding in 3D-HEVC, a hybrid block-based motion-compensated DCT-like transform coding architecture similar to that for the texture component is utilized. The basic unit for compression, termed as coding unit (CU), is a 2N×2N square block. Each CU can be recursively split into four smaller CUs until a pre-defined minimum size is reached. Each CU contains one or multiple prediction units (PUs). The PU size can be 2N×2N, 2N×N, N×2N, or N×N. When asymmetric motion partition (AMP) is supported, the PU size can also be 2N×nU, 2N×nD, nL×2N or nR×2N.

For depth coding in 3D-HEVC, a motion vector competition (MVC) based scheme is also applied to select one motion vector predictor/disparity vector predictor (MVP/DVP) among a given candidate set of MVPs/DVPs. The candidate set of MVPs/DVPs includes spatial and temporal MVPs/DVPs. There are three inter-prediction modes including Inter, Skip, and Merge in HTM-4.0. The Inter mode performs motion-compensated prediction/disparity-compensated prediction with transmitted motion vectors/disparity vectors (MVs/DVs), while the Skip and Merge modes utilize motion inference methods to obtain the motion information from spatial blocks located in the current picture or a temporal block located in a temporal collocated picture which is signaled in the slice header. When a PU is coded in either Skip or Merge mode, no motion information is transmitted except an index of the selected candidate. In the case of a Skip PU, the residual signal is also omitted. For the Inter mode in HTM-4.0, the advanced motion vector prediction (AMVP) scheme is used to select a motion vector predictor among an AMVP candidate set including two spatial MVPs/DVPs and one temporal MVP/DVP. As for the Merge and Skip modes, the Merge scheme is used to select a motion vector predictor among a Merge candidate set containing four spatial merging candidates and one temporal merging candidate. Based on the rate-distortion optimization (RDO) decision, the encoder selects one final MVP/DVP within a given candidate set of MVPs/DVPs for Inter, Skip, or Merge modes and transmits the index of the selected MVP/DVP to the decoder. The selected MVP/DVP may be linearly scaled according to temporal distances or view distances.

Figure 2:
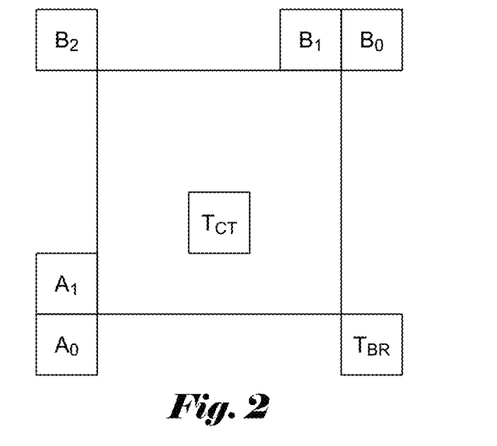
FIG. 2 illustrates an example of a candidate set comprising motion vector predictor (MVP)/disparity vector predictor (DVP) based on previously coded spatial and temporal blocks.

For Inter mode of depth coding, the reference picture index is explicitly transmitted to the decoder. The MVP/DVP is then selected among the candidate set for a given reference picture index. As shown in FIG. 2, the MVP/DVP candidate set for the Inter mode in HTM-4.0 includes two spatial MVPs/DVPs and one temporal MVP/DVP. The size of MVP/DVP candidate set is fixed to 2:

1. Left spatial predictor (the first available MV/DV from $A_0$, $A_1$),
2. Top spatial predictor (the first available MV/DV from $B_0$, $B_1$, $B_2$), 3. Temporal predictor (the first available MV/DV from $T_{BR}$ and $T_{CT}$), and 4. Zero predictor (zero MV/DV).

For depth coding in 3D-HEVC, if a particular block is encoded as Merge mode, a Merge index is signaled to indicate which MVP/DVP among the Merge candidate set is used for this block to be merged. To follow the essence of motion information sharing or re-use, each merged PU re-uses the MV, prediction direction, and reference picture index of the selected candidate. As shown in FIG. 2, the Merge candidate set includes four spatial merging candidates and one temporal merging candidate. The size of Merge candidate set (also called candidate list) is fixed to 5:

1. Left spatial predictor ($A_1$)
2. Top spatial predictor ($B_1$)
3. Above right spatial predictor ($B_0$)
4. Below left spatial predictor ($A_0$)
5. Top left predictor ($B_2$)
6. Temporal predictor (the first available M from $T_{BR}$ and $T_{CT}$)
7. Additional predictor (Bi-predictive candidate, zero candidate)

In order to enable efficient encoding of the depth map data, in HTM-4.0, a new coding mode, named motion parameter inheritance (MPI), that allows inheritance of the treeblock subdivision into CUs and PUs and their corresponding motion parameters from the texture data has been introduced. Since the motion vectors of the video signal have quarter-sample accuracy, whereas for the depth map signal only full-sample accuracy is used, in the inheritance process the motion vectors are quantized to their nearest full-sample position. It can be adaptively decided for each block of the depth map, whether the motion data is inherited from the collocated block of the video signal or if new motion data are transmitted. For signaling the MPI coding mode, the Merge/Skip mode syntax is used. The list of possible Merge candidates has been extended in a way that, for depth map coding, the first Merge candidate refers to merging with the corresponding block from the associated video signal. Since the motion data along with the CU splitting structure of the texture is re-used by the depth, the MPI scheme introduces additional buffer to store the inter-dir (used to indicate the prediction direction) and split flag (used to indicate the CU splitting) information.

Figure 3:
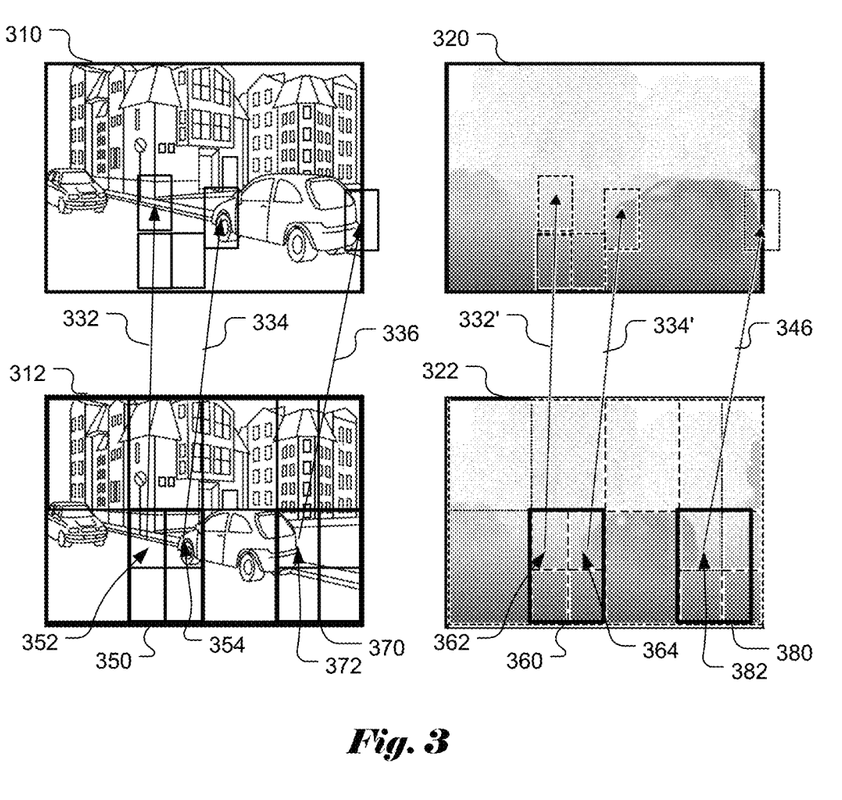
FIG. 3 illustrates an example of motion parameter inheritance as adopted in high efficiency video coding (HEVC) based Test Model version 4.0 (HTM-4.0).

FIG. 3 illustrates an example of MPI for depth coding in 3D-HEVC. Texture picture 312 corresponds to a current picture and texture picture 310 corresponds to a picture at a reference time instance. Both texture pictures 310 and 312 are in the same view. Block 350 (e.g., a PU) in current picture 312 is partitioned into four sub-blocks. Motion vectors 332 and 334 are associated with sub-blocks 352 and 354. Depth block 360 is collocated with texture block 350 and may inherit motion parameters from texture block 350. Accordingly, sub-blocks 362 and 364 may inherit motion parameters (e.g., motion vectors 332' and 334') from respective sub-blocks 352 and 354. Block 370 in current picture 312 is partitioned into four sub-blocks. Motion vector 336 is associated with sub-block 372. Depth block 380 is collocated with texture block 370. Depth sub-block 382 does not inherit motion information from texture collocated sub-block. In this case, an own motion vector 346 is transmitted for the corresponding depth sub-block 382. For signaling the MPI coding mode, the Merge/Skip mode syntax is used. The list of possible Merge candidates has been extended for depth map coding so that the first Merge candidate refers to merging with the corresponding block of the associated video signal, i.e., inheriting motion parameters of the corresponding block of the associated video signal in this case.

The MPI mode can be used in any level of the hierarchical coding-tree block of the depth map. If the MPI mode is indicated at a higher level of the depth map coding tree, the depth data in this higher level unit can inherit the CU/PU subdivision as well as the corresponding motion data from the video signal. This higher level unit may be larger than the CU size for the video signal. Accordingly, it is possible to specify MPI mode for a whole tree-block, typically corresponding to 64×64 image samples, and the whole tree-block of the depth map is partitioned into CUs and PUs by inheriting the CU and PU partitioning of the corresponding block of the video signal. If the MPI mode is indicated at a level of the coding tree that is smaller than or the same size as the corresponding CU size of the video signal, only the motion data are inherited from the video signal. When the MPI mode is used, not only the partitioning and the motion vectors, but also the reference picture indices are inherited from the video signal. Therefore, it has to be ensured that the depth maps corresponding to the video reference pictures are also available in the reference picture buffer for the depth signal. The MPI mode is only possible, if the whole block of the video signal is coded using Inter prediction. Since MPI allows depth blocks to inherit motion vectors, reference index and CU/PU structures, it causes parsing dependency between the depth component and the texture component. Furthermore, there is also a need to store CU/PU structure information for the texture component.

SUMMARY OF THE INVENTION

A method and apparatus for depth coding in a three-dimensional video coding system incorporating texture merging candidate or texture MVP/DVP candidate are disclosed. Embodiments of the present invention identify a texture collocated block of a texture picture in the given view corresponding to a current depth block. A Merge candidate or a motion vector predictor (MVP)/disparity vector predictor (DVP) candidate is derived from a candidate list including a texture candidate, wherein the texture candidate is derived from motion information associated with the texture collocated block. Coding or decoding is then applied to the input data associated with the current depth block using the texture candidate if the texture candidate is selected as the Merge candidate in Merge mode or the texture candidate is selected as the MVP/DVP candidate in Inter (advanced motion vector prediction; AMVP) mode.

One aspect of the present invention addresses determination of the motion information associated with the texture collocated block. In one embodiment, the motion information associated with the texture collocated block is selected based on the motion information of a selected texture sub-block within the texture collocated block. The selected texture sub-block may correspond to an upper-left, upper-right, lower-left or lower-right sub-block of a center point of the texture collocated block. In one embodiment, the Merge candidate or the MVP/DVP candidate associated with the texture collocated block is treated as unavailable if the selected texture sub-block is Intra-coded or a reference picture of the selected texture sub-block has no corresponding depth picture in the given view. In another embodiment, the motion information associated with the texture collocated block corresponds to the motion information of a second selected texture sub-block within the texture collocated block if the first selected texture sub-block is Intra-coded or a reference picture of the texture collocated sub-block has no corresponding depth picture in the given view. In yet another embodiment, the motion information associated with the texture collocated block corresponds to the motion information of a neighboring texture sub-block adjacent to the texture collocated block if the selected texture sub-block is Intra-coded or a reference picture of the texture collocated sub-block has no corresponding depth picture in the given view. The motion vector, reference picture index and reference list of the selected texture sub-block can be re-used by the current depth prediction unit (PU), or motion information of the current depth PU can be derived from the motion vector, reference picture index and reference list of the selected texture sub-block, if the texture collocated block is selected as the Merge candidate in the Merge mode.

The Merge candidate or the MVP/DVP candidate associated with the texture collocated block can be placed at the first position in the candidate list for candidate derivation. The motion information for the texture component can be rounded to a same resolution as the motion information of the depth component for re-use by the current depth block if the texture motion information has higher resolution. For example, if the texture motion vector has quarter-pixel precision and the depth motion vector has integer-pixel precision, the texture motion vector will be rounded to integer-pixel precision for re-use by the depth block. Syntax can be signaled in a sequence level, picture level or slice level of a bitstream to indicate whether the candidate list including the texture candidate for deriving the Merge candidate or the MVP/DVP candidate. Data splitting structure such as CU or PU splitting structure of the current depth block is independent from data splitting structure of the texture collocated block when the texture candidate is selected.

DETAILED DESCRIPTION

As mentioned before, the existing 3D video coding for depth data may use Motion Parameter Inheritance (MPI) to allow a depth block to inherit motion parameters and CU/PU splitting structure from a texture block. The MPI technique suffers the drawbacks of parsing dependency between depth data and texture data. MPI can be included as a candidate of motion vector competition (MVC) scheme for depth data coding in 3D video coding system. In this case, motion vector competition (MVC) to select one motion vector predictor/disparity vector predictor (MVP/DVP) among a given candidate set of MVPs/DVPs including MPI. In the merging candidate derivation process for depth data, the spatial or temporal candidates are all based on depth data. Therefore, the MVC technique ignores the correlation between the texture component and the depth component corresponding to a same scenery.

In the present invention, a motion vector/disparity vector prediction scheme for depth coding is disclosed, where the motion information (e.g. MV/DV, reference index, prediction direction) for depth data is predicted using the motion information of the texture picture.

Figure 4:
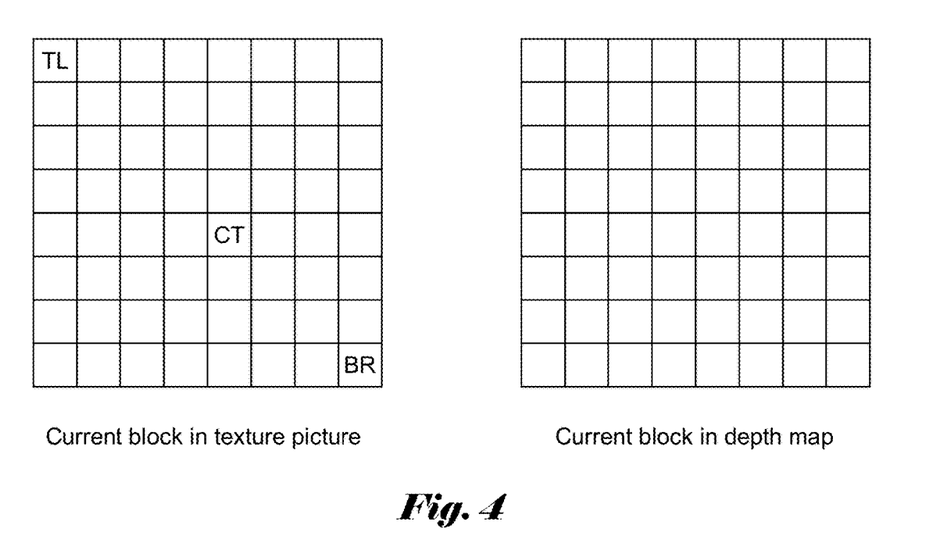
FIG. 4 illustrates an example of a texture collocated block and texture collocated sub-blocks corresponding to a current depth block.

In one embodiment, when coding a depth PU, the depth PU can use the motion information of the collocated block of the texture picture at the same time instance to derive the merging candidate for Merge mode or derive the MVP/DVP candidate for AMVP mode. In the remaining parts of this disclosure, we will use texture collocated block to represent the collocated block in the texture picture of the same time instance. Different examples for deriving texture collocated blocks are described as below:

Texture Collocated Block Derivation Example. The motion information associated with the texture collocated block can be derived based on the motion information of any 4×4 sub-block within the texture collocated block as shown in FIG. 4. For example, the top-left (i.e., TL in FIG. 4), center (i.e., CT in FIG. 4) or bottom-right (i.e., BR in FIG. 4) sub-block can be selected and the associated motion information is used for depth coding. In this disclosure, the term sub-block is not necessary to be a segment divided from the texture collocated block, it is for describing the location for retrieving the motion information.

In another embodiment, the Merge candidate for a depth block is derived from the texture collocated block and the candidate is termed as a texture merging candidate. If the texture merging candidate is selected, the merged PU derives or re-uses the motion information such as motion vector (MV), prediction direction, and reference picture index of the texture collocated block.

According to yet another embodiment, multiple texture collocated sub-blocks can be checked in a pre-defined order. The process for deriving a texture merging candidate will check each texture collocated sub-block. If the MV/DV associated with a first texture collocated sub-block is not valid, the process continues to derive the candidate based on the next texture collocated sub-block until a valid MV/DV is available or all texture collocated sub-blocks are checked. The invalid condition may correspond to the cases that the texture collocated sub-block is Intra-coded; the reference picture of the texture collocated sub-block does not have a corresponding depth picture in current view; or the corresponding depth picture in current view is not available. Exemplary checking order is listed as follows, where the sub-block locations are shown in FIG. 4:

Checking order 1: CT
Checking order 2: TL
Checking order 3: BR
Checking order 4: CT→BR
Checking order 5: BR→CT
Checking order 6: CT→TL
Checking order 7: CT→BR→TL In some embodiments, more than one texture merging candidates are allowed, for example, one texture merging candidate derived from the centre location of the texture collocated block and another texture merging candidate derived from the bottom-right location of the texture collocated block are included in the candidate set.

Figure 5:
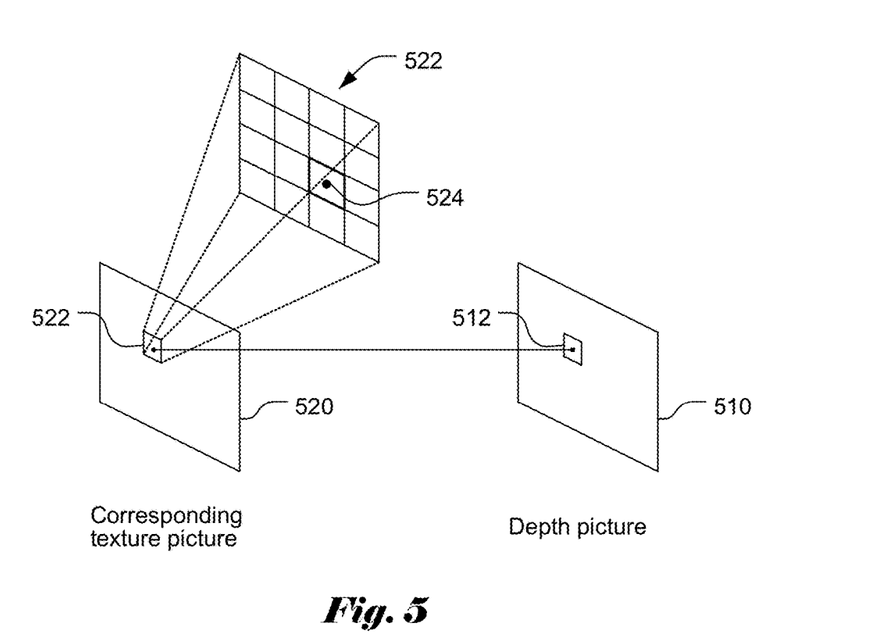
FIG. 5 illustrates an example of motion information from a texture collocated block re-used by a corresponding depth block.

When the texture merging candidate is selected to code a depth block, the motion information of the depth block (512) in a depth map (510) re-uses the motion information of a texture collocated block (522) of a texture picture (520) as shown in FIG. 5. The texture collocated block (522) may contain multiple sub-blocks. The motion information of the texture collocated block (522) may be selected from a sub-block (524) of the texture collocated block (522). For example, the sub-block may correspond to the sub-block located at a lower right location of a center point of the texture collocated block. Nevertheless, other sub-block such as upper-left, upper right or lower-left sub-block may also be used. The motion information may include motion vector, reference picture index and reference list. The texture merging candidate can be placed in any position of the merging candidate list. For example, if the texture merging candidate is available, it can be placed in the first position before the Left candidate, where the block locations are shown in FIG. 2:

1. Texture merging candidate
2. Left predictor ($A_1$)
3. Top predictor ($B_1$)
4. Above right predictor ($B_0$)
5. Below left predictor ($A_0$)
6. Top left predictor ($B_2$)
7. Temporal predictor (the first available MV/DV from $T_{BR}$ and $T_{CT}$)
8. Additional predictor (Bi-predictive candidate, zero candidate)

In yet another embodiment, the AMVP (advanced motion vector prediction) candidate derived from the texture collocated block is termed as texture MVP/DVP candidate. Two exemplary methods for deriving the texture MVP/DVP candidate are described as below:

Texture MVP/DVP Candidate Derivation Example 1. For a given target reference picture and reference list, the search order is as follows:

1. Search MV/DV pointing to the target reference picture within the given reference list. If the MV/DV is available, set the MV/DV as MVP/DVP candidate and terminate the process; otherwise, go to next step.
2. Search MV/DV pointing to the target reference picture within the other reference list. If the MV/DV is available, set the MV/DV as MVP/DVP candidate and terminate the process; otherwise, set the MVP/DVP candidate as not available.

Texture MVP/DVP Derivation Example 2. For a given the target reference picture and reference list, the search order is as follows:

1. Search MV/DV pointing to the target reference picture within the given reference list. If the MV/DV is available, set the MV/DV as the MVP/DVP candidate and terminate the process; otherwise, go to next step.
2. Search MV/DV pointing to the target reference picture within the other reference list. If the MV/DV is available, set the MV/DV as the MVP/DVP candidate and terminate the process; otherwise, go to next step.
3. Search MV/DV pointing to the other reference picture within the given reference list. If the MV/DV is available, scale the MV/DV according to POC distance, set the scaled MV/DV as the MVP/DVP candidate and terminate the process; otherwise, go to next step.
4. Search MV/DV pointing to the other reference picture within the other reference list. If the MV/DV is available, scale the MV/DV according to POC distance, set the scaled MV/DV as the MVP/DVP candidate and terminate the process; otherwise, set the MVP/DVP candidate as not available.

In the above candidate derivation method, Step 2 and Step 3 can be switched to provide another searching order. The texture MVP/DVP candidate can be placed in any position of the MVP/DVP candidate list for Inter mode. For example, if the texture MVP/DVP candidate is available, it can be placed at the first position before the Left candidate:

1. Texture MVP/DVP candidate
2. Left predictor (the first available MV/DV from $A_0$, $A_1$)
3. Top predictor (the first available MV/DV from $B_0$, $B_1$, $B_2$)
4. Temporal predictor (the first available MV/DV from $T_{BR}$ and $T_{CT}$)
5. Zero predictor (zero MV)

The MV/DV precision of the texture component may be finer than that of the depth component. There are various ways to convert from the higher MV/DV precision for the texture component to the lower MV/DV precision for the depth component. Two example are listed as follows:

1. Truncate the texture MV/DV to the precision of the depth MV/DV, and
2. Round the texture MV/DV to the precision of depth MV/DV.

Syntax can be signaled in sequence level, picture level or slice level in the bitstream to indicate whether to use the texture merging candidate or the texture MVP/DVP candidate.

In the Merge candidate derivation process for the texture component and the depth component, HTM-4.0 uses the motion vector competition (MVC) based scheme to select a Merge candidate set. For the inter-view prediction, HTM-4.0 uses very different approaches for the texture component and the depth component. For the texture component, an inter-view candidate is used. However, for the depth component, the motion parameter inheritance (MPI) scheme is used, which is an alternative to MVC. The present invention provides a harmonized approach to determine motion information re-use only based on candidates. Table 1 illustrates a comparison of motion information re-use between HTM-4.0 and an embodiment of the present invention. As described before, the texture merging candidate is included in the Merge candidate set according to an embodiment of the present invention. Although MPI appears in the merge candidate set in HTM-4.0.1, MPI is not a candidate. When MPI mode is selected, the encoder uses the merge/skip mode syntax to signal the enable/disable of MPI coding mode. The decoder can therefore be informed to decode the current depth block using MPI mode instead of Merge/Skip/Inter mode. When coding the depth data using MPI mode, data splitting structure of the texture data is also reused by the depth data. The texture merging candidate of the present invention follows the merge/skip mode, which derives only the motion information from the texture collocated block, data splitting structure (e.g. CU/PU splitting structure) of the depth block is independent from data splitting structure of the texture collocated block.

TABLE 1

| Merge candidate set in HTM-4.0.1 | | Merge candidate set in the proposed scheme | |
|---|---|---|---|
| Texture | Depth | Texture | Depth |
| 1. Inter-view candidate | 1. MPI 2. Spatial | 1. Inter-view candidate | 1. Texture candidate |

TABLE 1-continued

| Merge candidate set in HTM-4.0.1 | | Merge candidate set in the proposed scheme | |
| --- | --- | --- | --- |
| Texture | Depth | Texture | Depth |
| 2. Spatial candidate | candidate | 2. Spatial candidate | 2. Spatial candidate |
| 3. Temporal candidate | 3. Temporal candidate | 3. Temporal candidate | 3. Temporal candidate |
| 4. Additional candidate | 4. Additional candidate | 4. Additional candidate | 4. Additional candidate |

The performance of a system incorporating an embodiment of the present invention is compared with the performance of an anchor system based on HTM-4.0 with MPI enabled as shown in Table 2. The performance comparison is performed based on different sets of test data listed in the first column. The BD-rate differences are shown in the second to fourth columns and a negative value in the BD-rate implies the present invention has a better performance. The first group of performance is the bitrate measure for texture video only, synthesized only (synth. only) and coded and synthesized (coded and synth.). As shown in Table 2, the improvement is about 0.2% for the synthesized only (synth. only) and coded and synthesized (coded and synth.). The processing times (encoding time, decoding time and rendering time) are also compared. As shown in Table 2, the encoding time, decoding time and rendering time are all slightly improved.

TABLE 2

| | Video only | video/ total bitrate | synth/ total bitrate | Enc time | Dec time | Ren time |
| --- | --- | --- | --- | --- | --- | --- |
| Balloons | 0.0% | −0.3% | −0.3% | 97.7% | 95.1% | 101.8% |
| Kendo | 0.0% | −0.1% | −0.1% | 95.2% | 97.6% | 101.4% |
| Newspapercc | 0.0% | −0.1% | 0.1% | 96.7% | 100.8% | 94.7% |
| GhostTownFly | 0.0% | −0.1% | −0.3% | 98.6% | 99.4% | 102.1% |
| PoznanHall2 | 0.0% | −0.6% | −0.5% | 97.1% | 99.2% | 99.8% |
| PoznanStreet | 0.0% | −0.1% | −0.2% | 98.3% | 97.0% | 97.4% |
| UndoDancer | 0.0% | 0.1% | 0.1% | 98.5% | 97.7% | 98.2% |
| 1024 × 768 | 0.0% | −0.2% | −0.1% | 96.5% | 97.8% | 99.3% |
| 1920 × 1088 | 0.0% | −0.2% | −0.2% | 98.1% | 98.3% | 99.3% |
| average | 0.0% | −0.2% | −0.2% | 97.4% | 98.1% | 99.3% |

Figure 6:
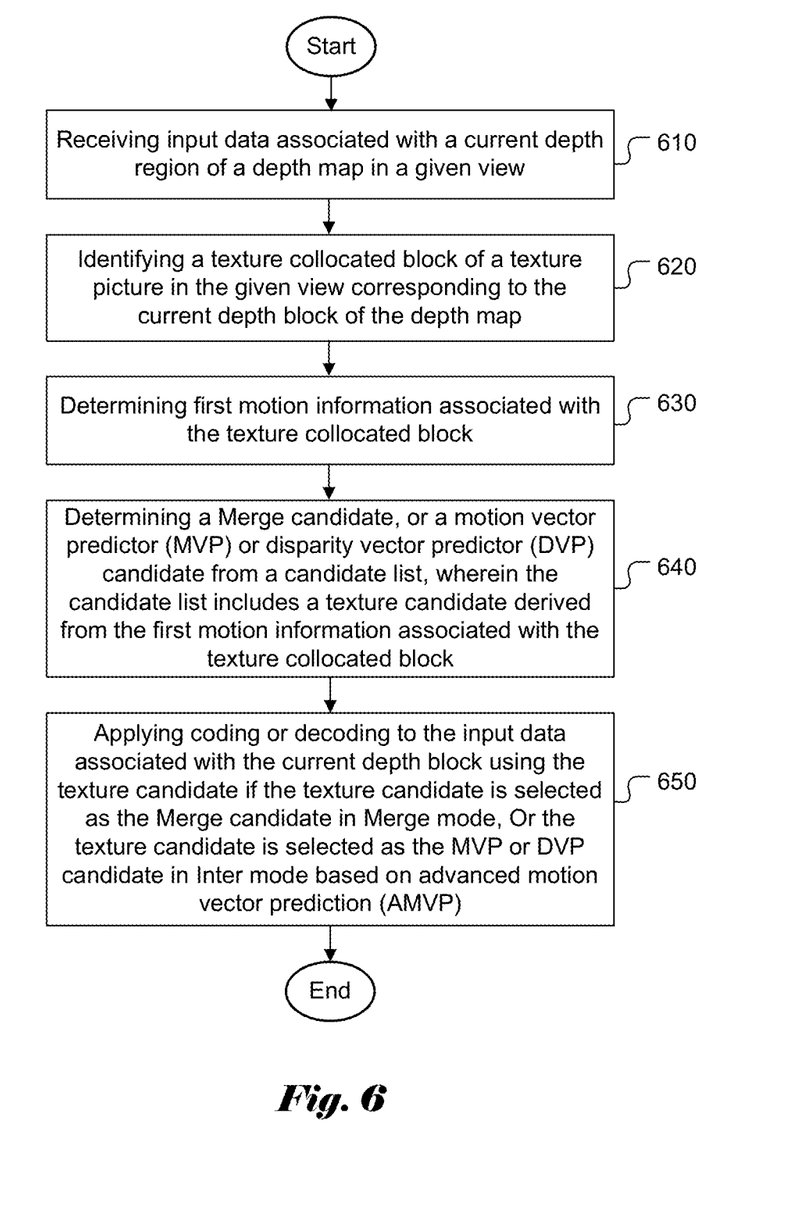
FIG. 6 illustrates an exemplary flowchart for a system incorporating texture merging candidate or texture MVP/DVP candidate according to an embodiment of the present invention.

FIG. 6 illustrates an exemplary flowchart for a three-dimensional coding system incorporating texture merging candidate or texture MVP/DVP candidate according to an embodiment of the present invention. The system receives input data associated with a current depth block of a depth map in a given view as shown in step 610. The input data may be retrieved from storage such as a computer memory, buffer (RAM or DRAM) or other media. The input data may also be received from a processor such as a controller, a central processing unit, a digital signal processor or electronic circuits that derives the input data. A texture collocated block of a texture picture in the given view corresponding to the current depth block of the depth map is identified as shown in step 620. First motion information associated with the texture collocated block is determined as shown in step 630. A Merge candidate or a motion vector predictor (MVP)/disparity vector predictor (DVP) candidate is derived from a candidate list including a texture candidate as shown in step 640. Coding or decoding is then applied to the input data associated with the current depth block using the texture candidate if the texture candidate is selected as the Merge candidate in Merge mode or the texture candidate is selected as the MVP/DVP candidate in Inter mode as shown in step 650.

The flowchart shown above is intended to illustrate an example of a three-dimensional coding system incorporating texture merging candidate or texture MVP/DVP candidate according to an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for depth coding in a three-dimensional video coding system, the method comprising:
   receiving input data associated with a current depth block of a depth map in a given view, wherein the current depth block is corresponding to a texture collocated block of a texture picture in the given view;

selecting one of a plurality of texture collocated sub-blocks within the texture collocated block and identifying whether the selected texture collocated sub-block is valid or not;

determining first motion information associated with the texture collocated block, wherein the first motion information associated with the texture collocated block corresponds to second motion information of the selected texture collocated sub-block corresponding to the texture collocated block when the selected texture collocated sub-block is identified as valid;

deriving a Merge candidate, or a motion vector predictor (MVP) or disparity vector predictor (DVP) candidate from a candidate list, wherein the candidate list includes a texture candidate derived from the first motion information associated with the texture collocated block; and applying coding or decoding to the input data associated with the current depth block using the texture candidate if the texture candidate is selected as the Merge candidate in Merge mode, or the texture candidate is selected as the MVP or DVP candidate in Inter mode based on advanced motion vector prediction (AMVP), wherein the selected texture collocated sub-block is not valid if:
the selected texture collocated sub-block is Intra-coded;
a reference picture of the selected texture collocated sub-block does not have a corresponding depth picture in a current view; or
a corresponding depth picture in the current view is not available.

2. The method of claim 1, wherein the selected texture sub-block corresponds to an upper-left, upper-right, lower-left or lower-right sub-block of a center point of the texture collocated block.

3. The method of claim 1, wherein the texture candidate associated with the texture collocated block is unavailable if the selected texture sub-block is Intra-coded or a reference picture of the selected texture sub-block has no corresponding depth picture in the given view.

4. The method of claim 1, wherein the first motion information associated with the texture collocated block corresponds to third motion information of a second selected texture sub-block within the texture collocated block if the selected texture sub-block is Intra-coded or a reference picture of the selected texture sub-block has no corresponding depth picture in the given view.

5. The method of claim 1, wherein the first motion information associated with the texture collocated block corresponds to third motion information of a neighboring texture sub-block adjacent to the texture collocated block if the selected texture sub-block is Intra-coded or a reference picture of the selected texture sub-block has no corresponding depth picture in the given view.

6. The method of claim 1, wherein a motion vector, reference picture index and reference list of the current depth block is derived from the second motion information associated with the selected texture sub-block if the texture candidate is selected as the Merge candidate in Merge mode.

7. The method of claim 1, wherein motion vector, reference picture index and reference list of the selected texture sub-block is re-used by the current depth block if the texture candidate is selected as the Merge candidate in Merge mode, and wherein the current depth block corresponds to a depth prediction unit (PU).

8. The method of claim 1, wherein the texture candidate is placed at a first position in the candidate list for Merge mode or Inter mode.

9. The method of claim 1, wherein the first motion information is rounded to a same resolution as motion information of the current depth block for re-use by the current depth block if the first motion information associated with the texture collocated block has higher resolution than the motion information of the current depth block.

10. The method of claim 9, wherein a first motion vector associated with the texture collocated block has quarter-pixel precision and the first motion vector is rounded to integer precision and used by the current depth block.

11. The method of claim 1, wherein syntax is signaled in a sequence level, picture level or slice level of a bitstream to indicate whether the candidate list including the texture candidate for deriving the Merge candidate, or the MVP or DVP candidate.

12. The method of claim 1, wherein a first motion vector (MV) or disparity vector (DV) associated with the texture collocated block is used as the MVP or DVP candidate if the first MV or DV points to a given target reference picture within a given reference list.

13. The method of claim 12, wherein a second motion vector (MV) or disparity vector (DV) associated with the texture collocated block is used as the MVP or DVP candidate if no first MV or DV points to the given target reference picture within the given reference list and the second MV or DV points to the given target reference picture within another reference list.

14. The method of claim 1, wherein data splitting structure of the current depth block is independent from data splitting structure of the texture collocated block when the texture candidate is selected as the Merge candidate in Merge mode or the texture candidate is selected as the MVP or DVP candidate in Inter mode.

15. An apparatus for depth coding in a three-dimensional video coding system, the apparatus comprising one or more electronic circuits and said one or more electronic circuits are configured to:

receive input data associated with a current depth block of a depth map in a given view, wherein the current depth block is corresponding to a texture collocated block of a texture picture in the given view;

select one of a plurality of texture collocated sub-blocks within the texture collocated block and identify whether the selected texture collocated sub-block is valid or not;

determine first motion information associated with the texture collocated block, wherein the first motion information associated with the texture collocated block corresponds to second motion information of the selected texture collocated sub-block corresponding to the texture collocated block when the selected texture collocated sub-block is identified as valid;

deriving a Merge candidate, or a motion vector predictor (MVP) or disparity vector predictor (DVP) candidate from a candidate list, wherein the candidate list includes a texture candidate derived from the first motion information associated with the texture collocated block; and apply coding or decoding to the input data associated with the current depth block using the texture candidate if the texture candidate is selected as the Merge candidate in Merge mode or the texture candidate is selected as the MVP or DVP candidate in Inter mode based on advanced motion vector prediction (AMVP), wherein the selected texture collocated sub-block is not valid if:

the selected texture collocated sub-block is Intra-coded;

a reference picture of the selected texture collocated sub-block does not have a corresponding depth picture in a current view; or a corresponding depth picture in the current view is not available.

16. The apparatus of claim 15, wherein the selected texture sub-block corresponds to an upper-left, upper-right, lower-left or lower-right sub-block of a center point of the texture collocated block.

17. The apparatus of claim 15, wherein the texture candidate associated with the texture collocated block is unavailable if the selected texture sub-block is Intra-coded or a reference picture of the selected texture sub-block has no corresponding depth picture in the given view.

18. The apparatus of claim 15, wherein the first motion information associated with the texture collocated block corresponds to third motion information of a second selected texture sub-block within the texture collocated block if the selected texture sub-block is Intra-coded or a reference picture of the selected texture sub-block has no corresponding depth picture in the given view.

19. The apparatus of claim 15, wherein the first motion information associated with the texture collocated block corresponds to third motion information of a neighboring texture sub-block adjacent to the texture collocated block if the selected texture sub-block is Intra-coded or a reference picture of the selected texture sub-block has no corresponding depth picture in the given view.

20. The apparatus of claim 15, wherein a motion vector, reference picture index and reference list of the current depth block is derived from the second motion information associated with the selected texture sub-block if the texture candidate is selected as the Merge candidate in Merge mode.

* * * * *